Inventor
Edward W. Miller
by Wright, Brown, Quinby & May
Attys

Inventor
Edward W. Miller
by Wright, Brown, Quimby & May
Attys

June 30, 1953  E. W. MILLER  2,643,583
MACHINE FOR CUTTING AND FINISHING
GEARS, ETC., BY FORM CUTTERS
Filed Feb. 1, 1947  9 Sheets—Sheet 6

Inventor
Edward W. Miller
by Wright, Brown, Quinby & May
Attys

Patented June 30, 1953

2,643,583

UNITED STATES PATENT OFFICE 2,643,583

MACHINE FOR CUTTING AND FINISHING GEARS, ETC., BY FORM CUTTERS

Edward W. Miller, Springfield, Vt., assignor to The Fellows Gear Shaper Company, Springfield, Vt., a corporation of Vermont Application February 1, 1947, Serial No. 725,884

17 Claims. (Cl. 90—9)

1

This invention relates to the art of cutting gears and particularly to machines of the class in which a cutting tool having the form or outline at its cutting edges of a prescribed gear tooth, or the space between two teeth is used. The objects include that of enabling helical as well as spur gears to be cut or finished by the employment of a formed tool; that of enabling either a rotating or stationary tool to be employed for the cutting action; that of crowning the gear teeth in the course of cutting or finishing; that of backing off the work from the cutter during noncutting strokes, either in conjunction with the performance of a crowning effect or without crowning, and of omitting the backing off action when crowning is performed in certain ways; the provision of means for reciprocating the work axially while the cutter remains in one location; the employment of hydraulic operating means for actuating the moving parts of the machine; electrical control of the hydraulic means; to make provisions in the structure of the machine for substitution of different types of cutter and different kinds of crowning means for one another; and in general to provide an improved machine of the form cutting type having superior utility in respect to economy of parts and efficiency of operation.

The principles of the invention by which the foregoing, and other, objects are accomplished may be embodied in different forms and arrangements, some of which are shown in the drawings which accompany this specification. Certain fundamental principles and parts are common to all of the illustrations there shown, but these fundamentals also may be embodied in specifically different designs.

In the drawings—

Fig. 1 is a central, vertical sectional view of a gear finishing machine containing the present invention;

Figs. 2 and 3 are vertical sections of the machine taken on lines 2—2 and 3—3, respectively, of Fig. 1 and viewed in the respective directions of the arrows applied to those lines;

2

Figure 1:
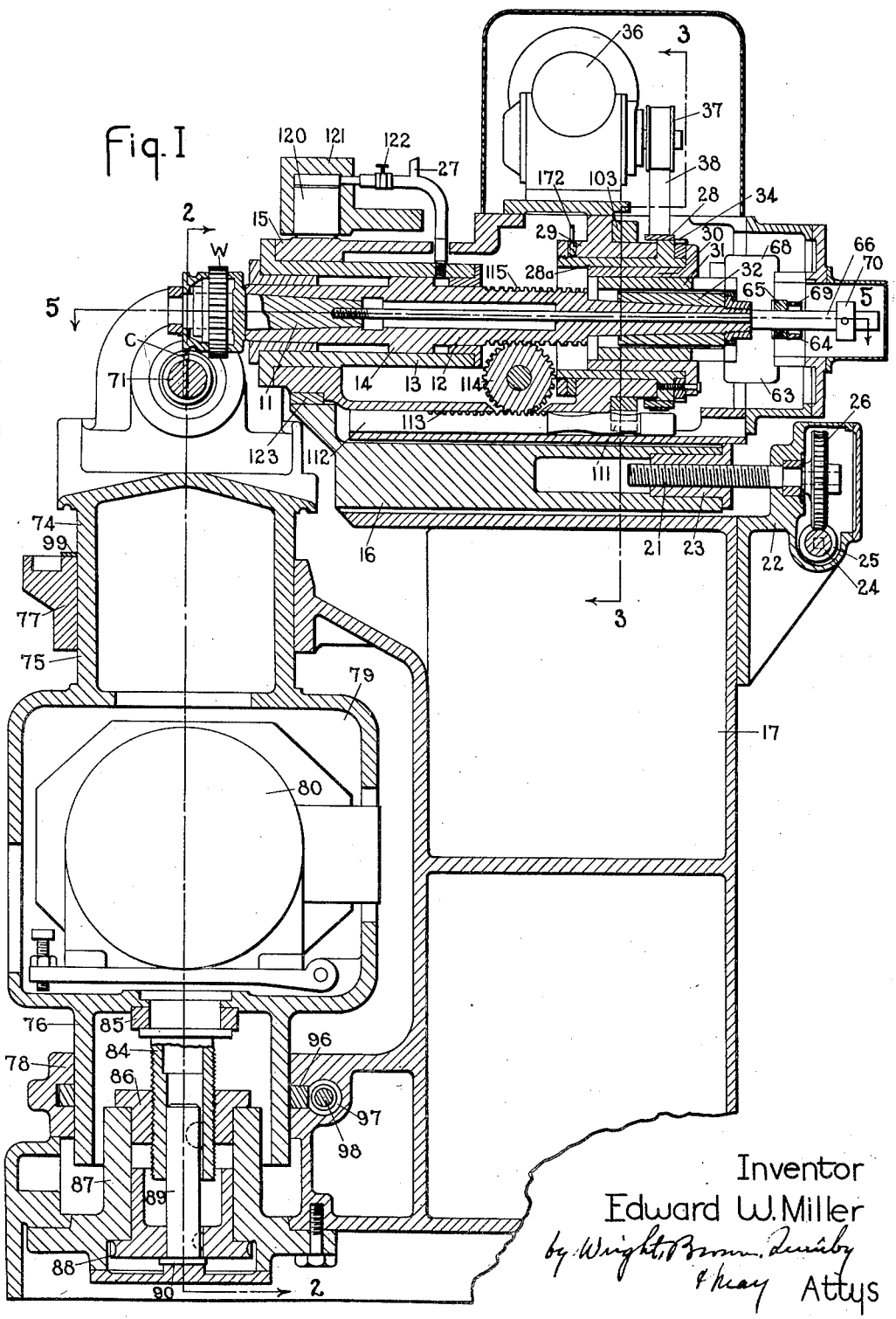
Figure 2:
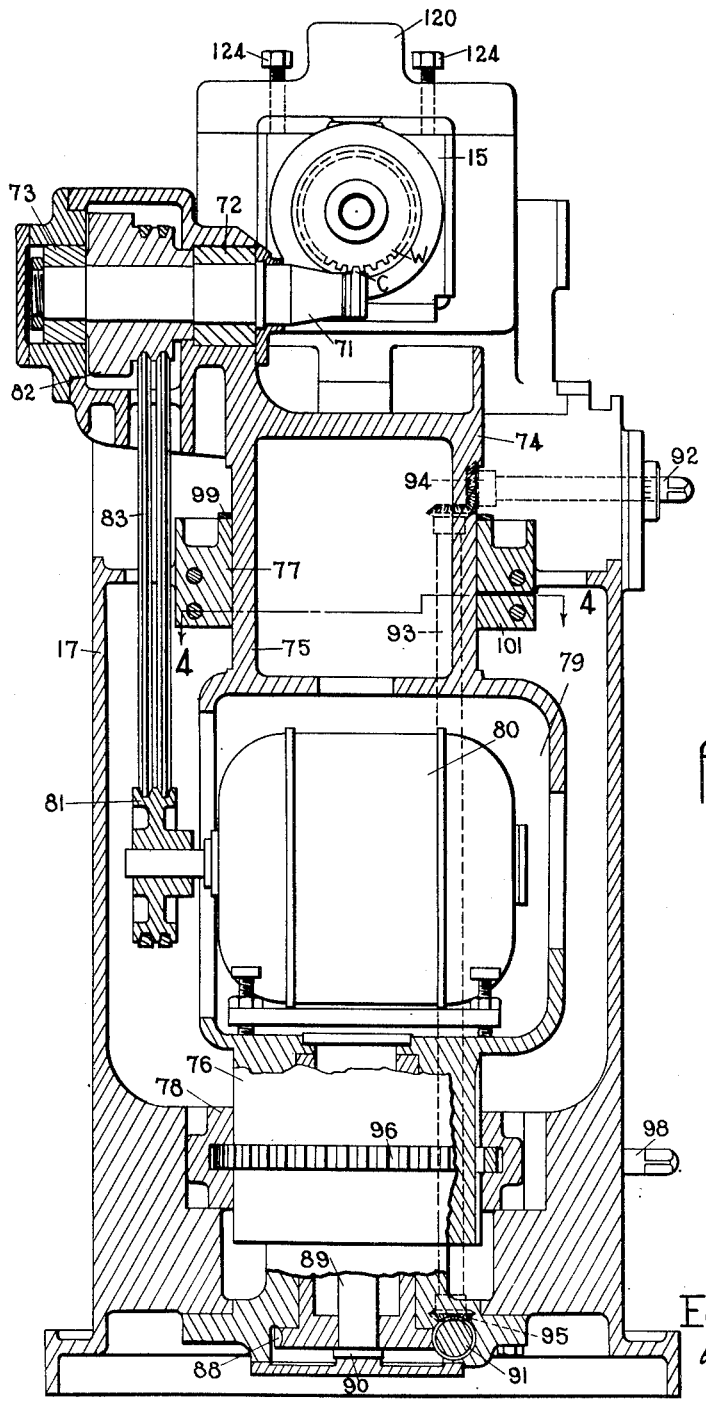
Figure 7:
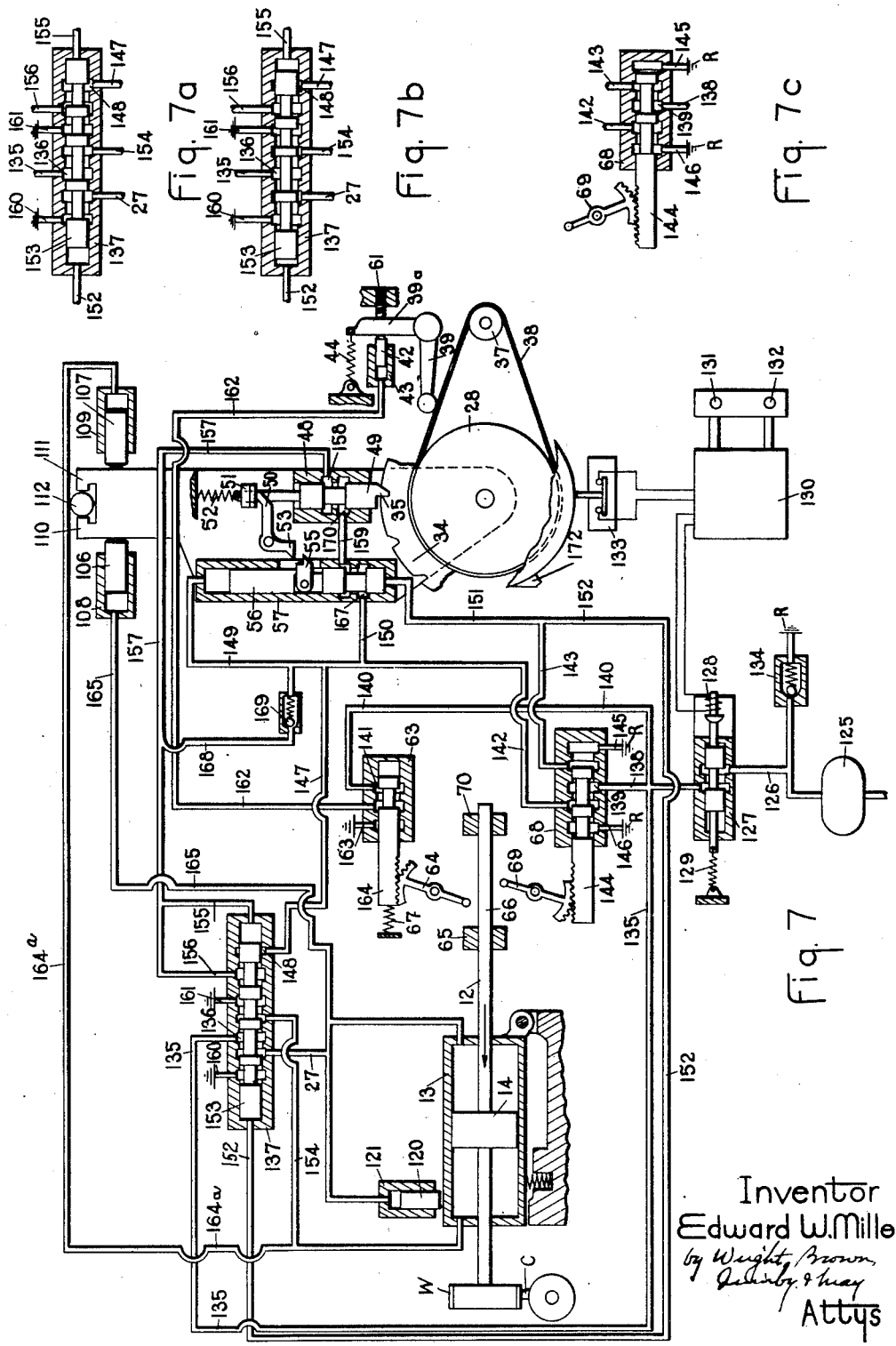
Fig. 7 is a diagram of the hydraulic operating means and electrical control means by which the operations of the machine are caused to take place.
Figure 8:
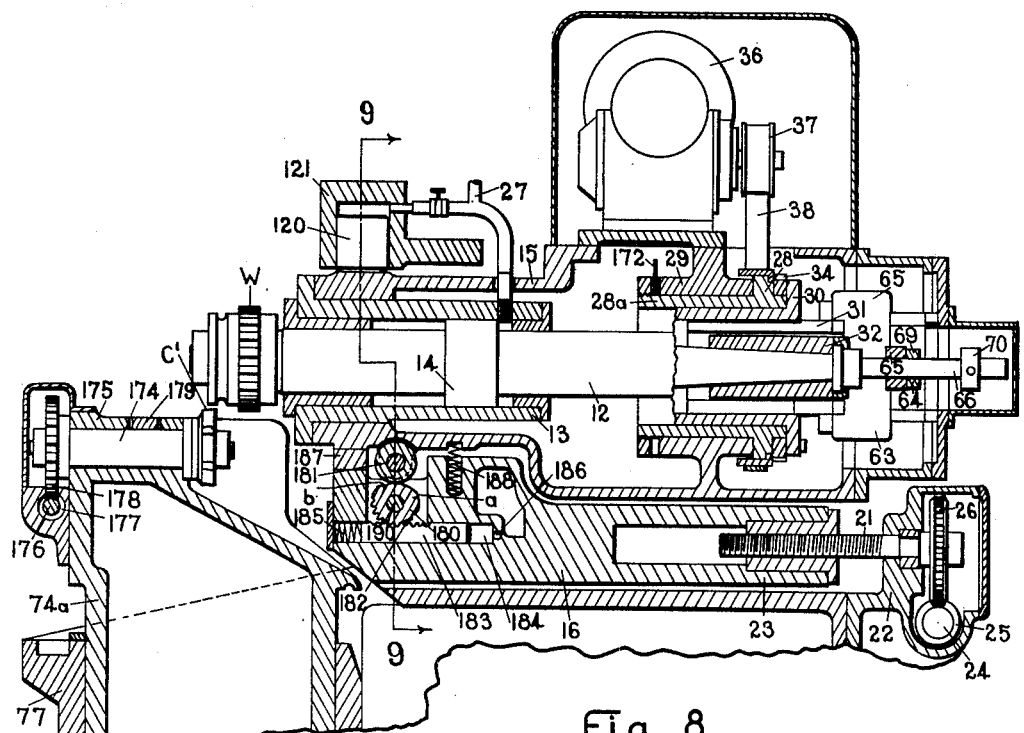
Figure 8A:
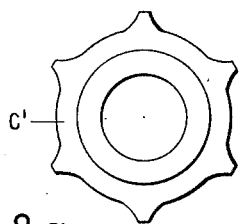
Figure 8B:
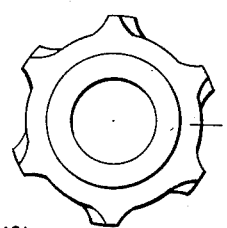
Figure 8C:
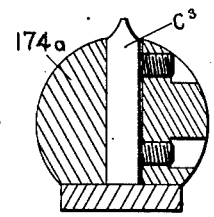
Figure 9:
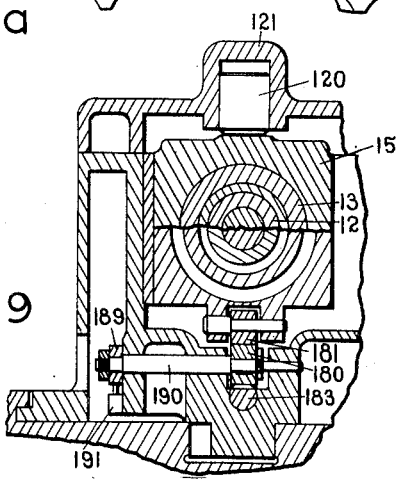
Figure 10:
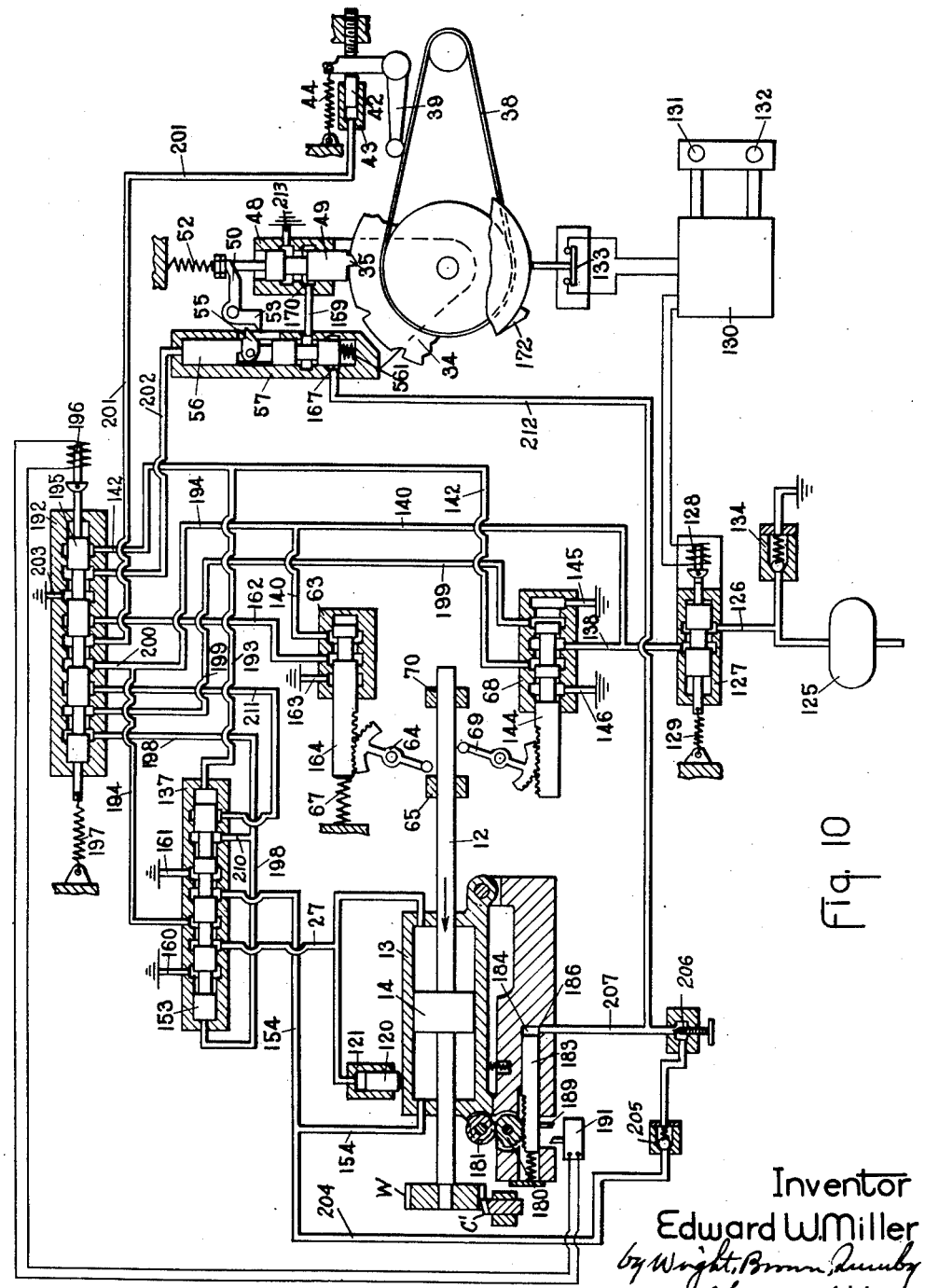
Figure 10A:
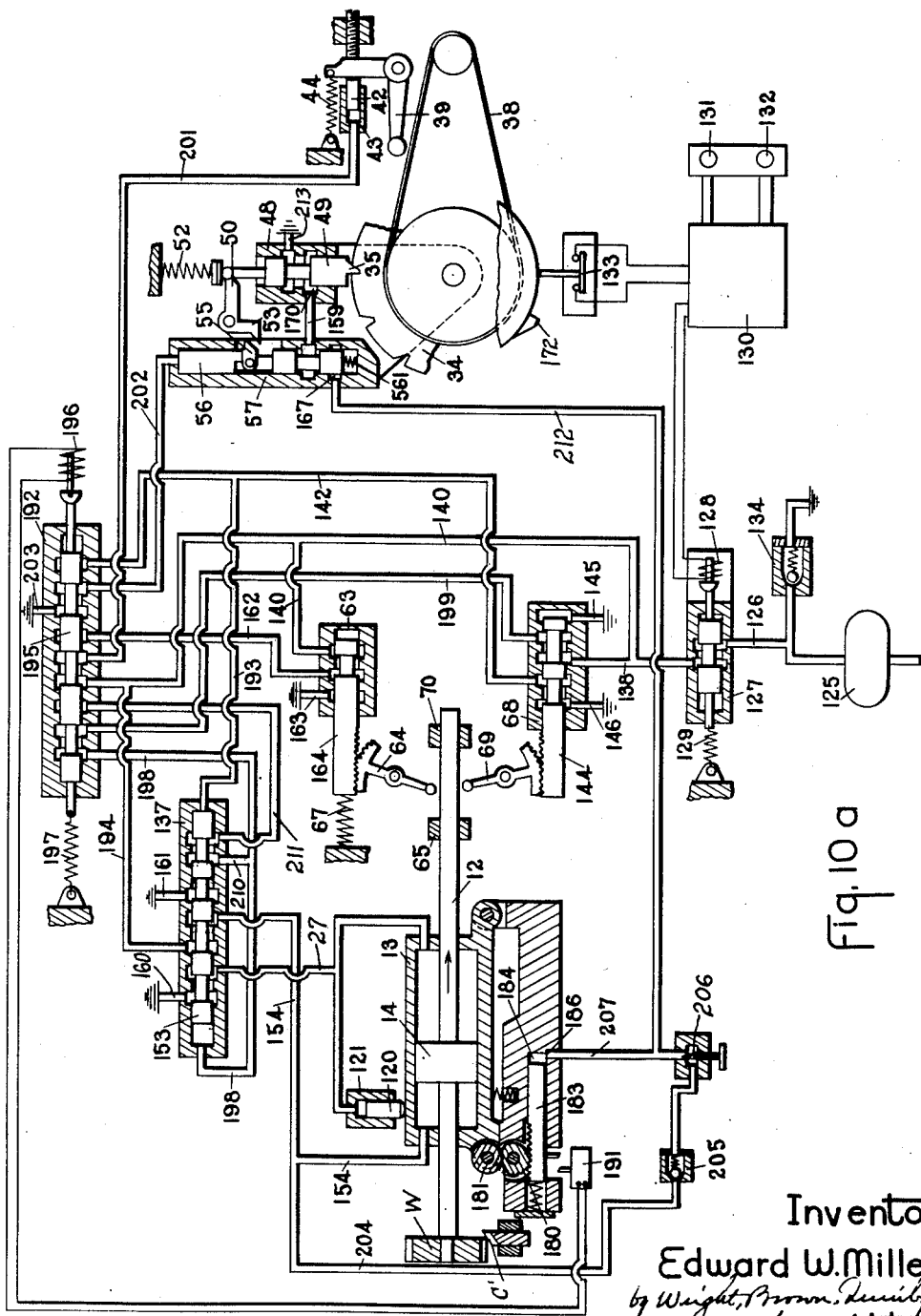
Figure 10B:
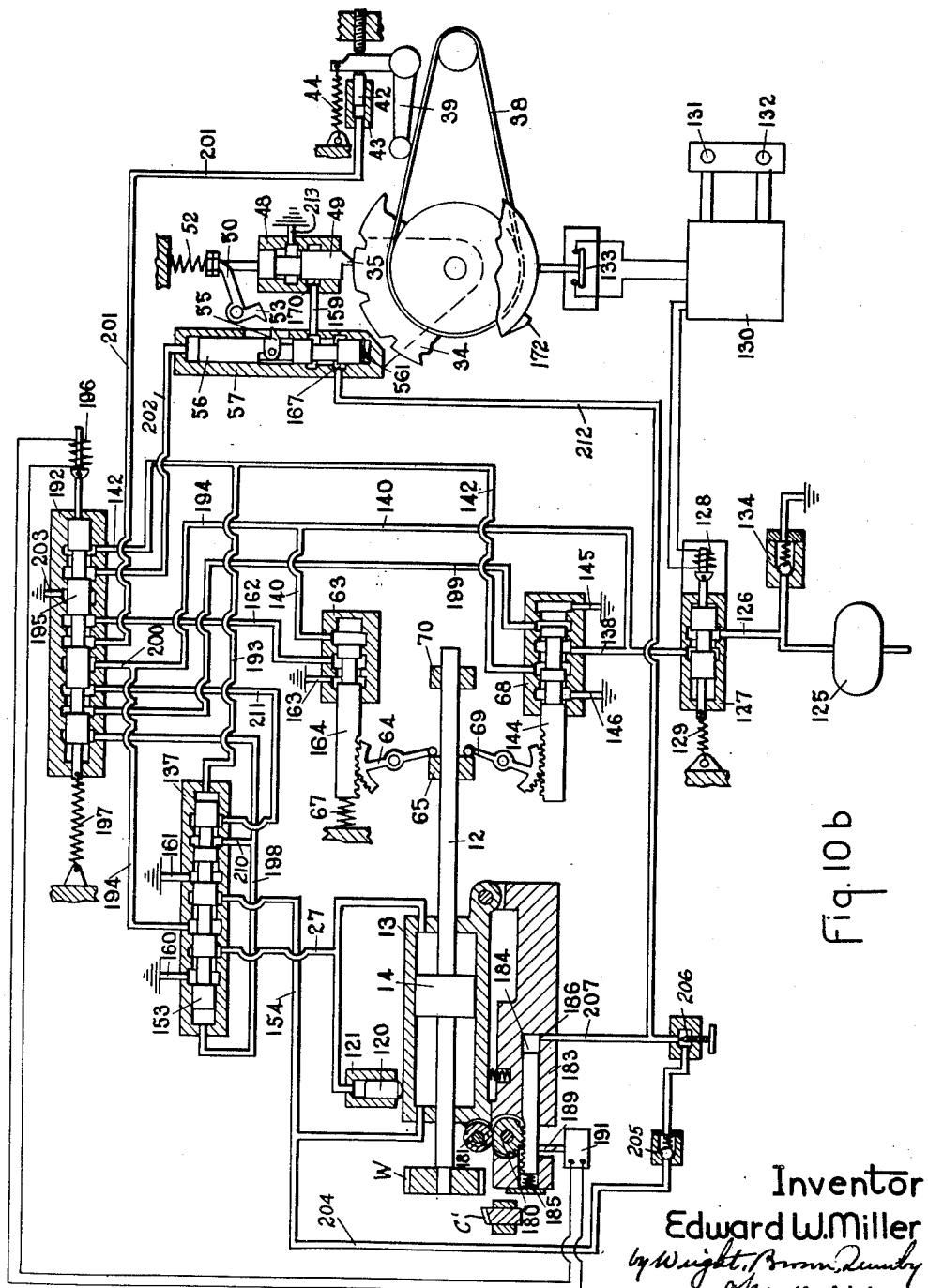

Figs. 7-a and 7-b are views showing the "main circuit valve" of the hydraulic system in the two positions, additional to that shown in Fig. 7, which said valve occupies during operation of the machine;

Fig. 7-c is a view showing the "stroke pilot valve" in a different position from that shown in Fig. 7;

Fig. 8 is a view similar to Fig. 1 showing the machine as modified by the substitution of another specific cutter and the provision of depth feeding means for the work;

Fig. 8-a is a face view of the cutter shown in Fig. 8;

Fig. 8-b and 8-c are views similar to Fig. 8 of other cutters interchangeable with that shown in Figs. 8 and 8-a;

Fig. 9 is a detail cross section taken on line 9—9 of Fig. 8;

Fig. 10 is a diagram of hydraulic operating and electrical control means containing modifications from the diagram shown in Fig. 7 to accommodate and operate the depth feeding means of Fig. 8;

Figs. 10-a and 10-b show the diagram of Fig. 10 with some of the controlling valves thereof in other positions.

Like reference characters designate the same parts wherever they occur in all the figures.

Figure 5:
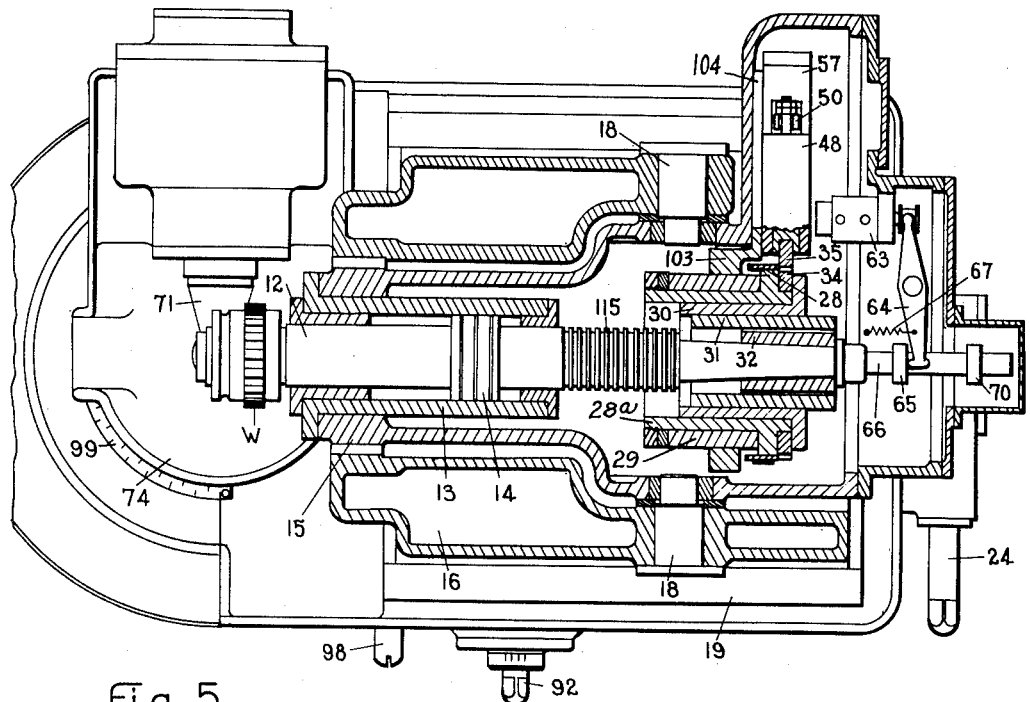
Fig. 5 is a horizontal sectional view taken on line 5—5 of Fig. 1.

In all forms of the invention herein illustrated, the work piece W, which may be an uncut gear blank, or a previously rough cut gear which requires a finishing operation, is reciprocated with respect to a formed cutter, (which remains constantly in the same location), in the direction of its axis and through a distance which causes all, or a prescribed part, of the length of its teeth (or width of its tooth bearing zone) to be incised by the cutter and withdraws it from the cutter from time to time to permit indexing. Referring particularly to Figs. 1–5, the work piece W is mounted on an arbor 11 by suitable means and the arbor is secured to a work spindle 12 which is reciprocable endwise in a hydraulic cylinder 13, the spindle having an enlargement 14 which serves as a piston. The hydraulic cylinder is mounted in a work saddle 15, which in turn is carried by a slide or work carriage 16 supported by a base structure 17. As shown in Fig. 5, the connection between the saddle 15 and carriage 16 is made by alined pivots 18, 19, the axis of which is perpendicular to the axis of the work spindle. By reference to Fig. 3, it is seen that the carriage 16 is confined between guides 19 and 20 on the top of the base which are parallel to the spindle and permit adjusting movement of the carriage, and with it the work spindle, to place the work piece in proper relation to the cutter and accommodate work pieces of different lengths in the axial dimension. An adjusting screw 21 is supported rotatably in a bracket 22 on the base 17 and meshed with a nut 23 secured to the carriage for placing the latter in desired positions. For rotating the screw, a shaft 24 is mounted in the bracket 22 and carries a worm 25 meshing with a worm wheel 26 secured to the screw.

Reciprocating motion is imparted to the work spindle by admission of working fluid to opposite ends of the cylinder alternately. The fluid used for this purpose may be oil, and will be considered as such for the purpose of this description. A part of the conducting means for delivering oil to one end of the cylinder is indicated by the pipe 27 in Fig. 1. The hydraulic system is shown only in part in the mechanical drawings, but completely in Fig. 7. The base structure 17 of the machine contains interior spaces in which a supply of oil may be held and part of the conduit system be contained; or a tank and the entire system of piping can be disposed externally of the base.

The work spindle 12 is coupled by means of a rotation-transmitting guide assemblage with a pulley 28, which is coaxial with the spindle and has a long sleeve portion 28a rotatably fitted in a bearing 29 in the saddle 15. The guide assemblage includes a cylindrical housing 30 fitted within and secured to the pulley, a guide element 31, which is a segment of a cylindrical shell, secured to the interior of the housing 30 and a complemental guide element 32 secured to the spindle. The guide elements 31 and 32 have complemental radial contact surfaces 33 shown in Fig. 3, which extend lengthwise of the spindle axis and permit endwise movement of the spindle and transmit rotation thereto whenever the pulley is rotated. The complemental surfaces 33 may be either straight in the axial direction and parallel to the spindle axis, or helical in greater or less degree, and guide elements differing in these respects are interchangeable with one another. When helical guides are provided, rotation is imparted to the spindle while it reciprocates, whereby helical teeth are cut or finished as the work piece travels past the cutter; while, when straight guides are used, spur teeth are cut or finished in like circumstances.

Figure 3:
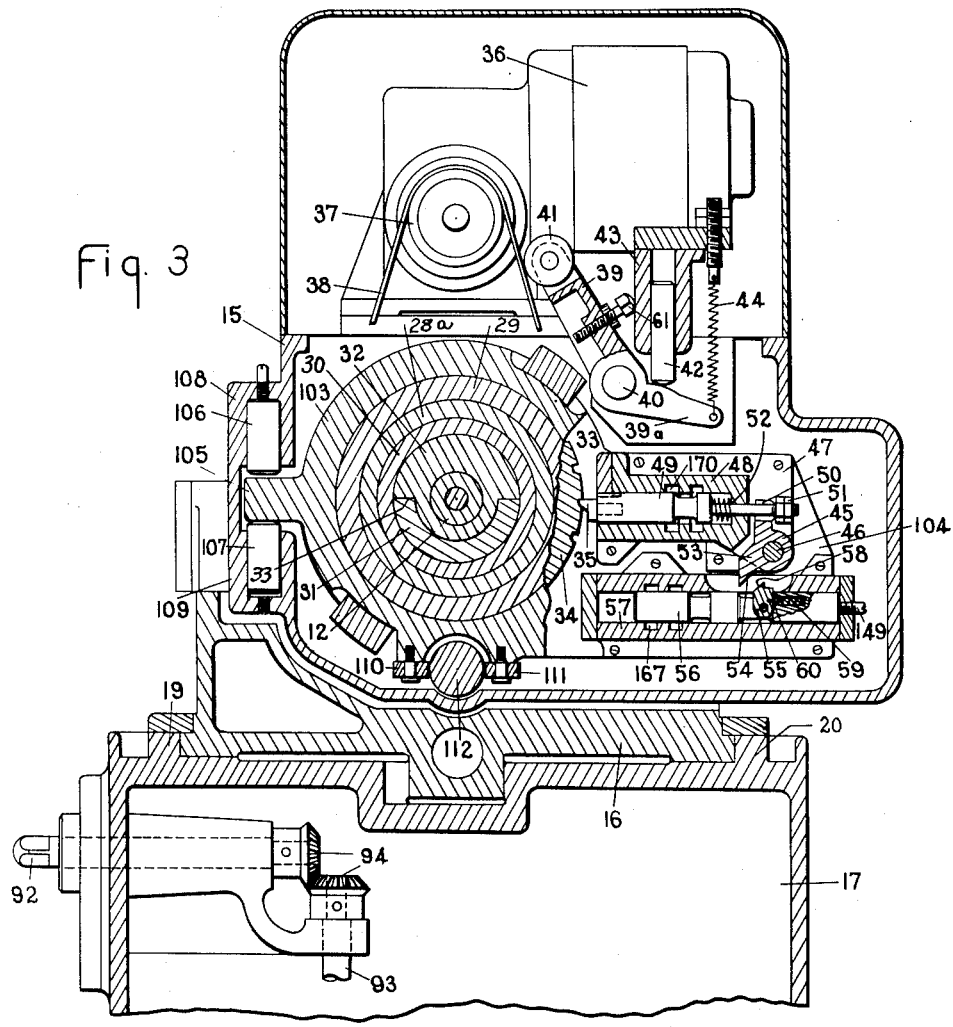
Figure 4:
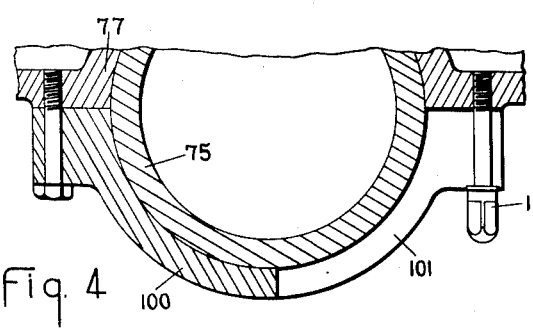
Fig. 4 is a detail sectional view taken on line 4—4 of Fig. 2.

Normally the pulley 28 is prevented from rotating (except for a slight rotation imparted in crowning the teeth), by a notched ring 34, which surrounds the pulley hub and is affixed thereon, and a latch 35 disposed, as shown in Fig. 3, to enter any one of the equally spaced notches in the outer circumference of the ring. A motor 36 is mounted on the saddle 15 and its power shaft carries a pulley 37 in the same plane with pulley 28. A belt 38 surrounds both pulleys loosely. This motor, which rotates constantly while the machine is in operation, and the notched ring 34 and latch 35 cooperate in indexing the work spindle and work piece with respect to the cutter. Hence motor 36 is called the indexing motor, the notched ring 34 is called the index plate, and the latch 35 is called the index latch. While the latch lies in one of the notches of the index plate, the belt 38 slips. But when the work needs to be indexed, the latch is retracted and simultaneously the belt is tightened. For thus tightening the belt, a lever 39 is provided, mounted on the work saddle by a pivot 40 which is parallel to the work spindle. One arm of the lever carries a roll 41 adjacent to the belt but withheld from pressure contact therewith by a plunger 42 in a hydraulic cylinder 43, which is forced against an arm 39a of the lever by fluid pressure in the cylinder. To accomplish indexing, which occurs at the end of retractive strokes of the spindle, the latch 35 is withdrawn from the index plate, and simultaneously the fluid pressure in cylinder 43 is relaxed, whereupon a spring 44, which is connected with the lever arm 39a as shown, causes the roll 41 to be pressed suddenly and strongly against the belt in a manner to tighten it around the pulleys.

A means for withdrawing the latch and releasing it quickly soon after it clears the confining edge of the notch, is shown in Fig. 3. This means includes a bell crank lever 45 mounted by a pivot 46 on the bracket 47 which supports a cylinder 48 in which a piston 49 carrying the latch is movably mounted. Lever 45 has a forked arm 50 embracing an extension rod, which protrudes from the piston 49 through the head of cylinder 48, and bearing on an adjustable abutment 51 on the rod. A spring 52 reacts between the piston 49 and cylinder head, holding abutment 51 against arm 50 and tending to project the latch toward the index plate. Lever 45 has an arm 53 which tapers to a thin edge at its extremity and is formed with a wedge or cam surface 54 in the path of movement of a dog 55 which is carried by a piston 56 reciprocable in a hydraulic cylinder 57. Dog 55 has a wedge surface 58 facing toward the surface 54 of lever 45 and terminating in a thin edge. The dog is normally pulled and held by a spring 59 against a shoulder 60 on the piston 56. The arrangement of these parts is such that, when piston 56 is shifted to the left from the normal position here shown to its limit of movement, dog 55 passes the lever arm 53, wedging or camming it out of the way, and thereby withdrawing the latch from the index plate. As soon as the dog has passed the lever, spring 52 projects the latch. The narrow width of the lever arm and dog at their outer limits allows the latch to be released immediately after it has been withdrawn from locking position and before the index disk has been rotated as much as the distance between two adjacent notches. Hence it bears on the outer circumference of the index plate and is again locked therewith as soon as the next notch reaches it. On return movement of the piston 56, the dog 55 yields in passing the lever arm 53, and is thereafter returned by spring 59 to operative position against the abutment 60.

Piston 56 is called for convenience, the latch retracting piston by reason of its herein described functions. Both this piston and the latch-carrying piston 49 act as valves which control flow of the working fluid in the hydraulic system, as later described.

An adjustable stop 61 is carried by the belt tension lever 39 to bear against an abutment on cylinder 43 and limit outward movement of plunger 42.

Flow of working fluid into and out of the cylinder 43 for actuating the belt tension means is controlled by a valve 63 shown in Fig. 5, which I call the belt tension valve. This valve contains a piston operated through a lever 64 by means of an adjustable dog 65 on an extension rod 66 of the work spindle 12. Normally the piston in valve 63 is held by a spring 67 in the position to admit working fluid to cylinder 43, whereby the belt tension lever is prevented from pressing against the belt 38, but dog 65 is placed on rod 66 so that it will engage lever 64 shortly before the work spindle reaches the end of prescribed retracting strokes, and then move the valve piston into a position which permits release of fluid from cylinder 43.

Another valve 68 which I call the stroke pilot valve is provided with a piston (not shown in the machine drawings) and with an operating lever 69, similar to lever 64, arranged to be moved alternately in opposite directions by dog 65 and a second adjustable dog 70 on the extension rod 66 to cause reversals of the work spindle. By suitable placement of these dogs, the strokes of the work spindle may be made of any length within the limits imposed by the length of cylinder 13.

The cutter shown in the machine combination now being described is a rapidly rotating fly cutter consisting of a single tooth or bit C mounted on a shaft 71 which rotates in bearings 72 and 73 supported by a stool 74. In this arrangement, where the work spindle is horizontal, the shaft or cutter spindle 71 is likewise horizontal and is located with its axis at right angles to the work spindle and projects from its supporting bearings so that the cutter lies and rotates in the vertical plane which includes the work spindle axis. Also the cutter is below the work spindle, but this is an immaterial detail. The cutting edges of the cutter are at the advancing side of the end thereof which protrudes from the shaft or spindle 71 and have outlines complemental to the face curves prescribed for the gear teeth. These edges may be disposed so as to enter the space between two teeth of a work gear and act on the adjacent faces of the embracing teeth; or they may be arranged to embrace a tooth of the work gear and act on opposite faces of the same tooth, the embracing parts of the cutter then projecting into two spaces of the work gear. Both forms of cutter are known in the machine tool art.

Stool 74 is of substantial length and transverse dimensions and has alined cylindrical trunnion portions 75 and 76 which occupy vertically alined bearings 77 and 78, respectively, in the base structure. The axis of these bearings intersects and is perpendicular to the axes of both the work spindle 12 and cutter spindle 71. The stool is enlarged between the bearings to provide a chamber 79, in which a motor 80 is mounted, which motor is coupled by pulleys 81, 82 and a belt 83 with the cutter spindle 71 so as to drive the latter rapidly.

Stool 74 is adjustable endwise to raise and lower the cutter spindle to accommodate work pieces of various diameters, and also angularly about its axis to accommodate the plane of rotation of the cutter to spur gears or helical gears of various helix angles. For the lengthwise or vertical adjustment, a tubular screw 84 is coupled coaxially with the stool through a thrust bearing 85 and is meshed with a nut 86 secured nonrotatably in one end of a bearing sleeve 87, which is fastened solidly to the base structure. Screw 84 is rotated to raise and lower the stool by means of a worm wheel 88 having a hub fitted to rotate in the bearing 87 and keyed to a coaxial shaft 89 which rests on a step bearing 90 and enters the central bore of screw 84, with which it has a splined engagement.

Worm wheel 88 is rotated by a worm 91 (Fig. 2), which is geared to an operating shaft 92 by a vertical shaft 93 and bevel gear pairs 94 and 95. Rotation is transmitted to the stool by a gear 96 which occupies an annular recess in bearing 78 and has a key occupying a longitudinal groove in the side of trunnion 76. A worm 97 meshes with gear 96 and is mounted on a shaft 98 which protrudes from the side of the base structure and is adapted to receive a crank or wrench. Angular adjustments of the stool are measured by a scale 99 on the upper end face of bearing 77 and an index on the adjacent surface of the trunnion 75.

Bearing 77 is formed in part by a semicylindrical offset in a transverse web of the base structure and in part by a semicylindrical yoke 100 (Fig. 4), which is bolted to the web and is partially subdivided to form a resilient clamping jaw 101, which may be set up by a screw 102 to grip the stool in its various adjustments, both endwise and angular.

The machine as organized in Figs. 1–5 is designed to finish previously rough cut gears by removing excess stock from the sides of the gear teeth, operating on the tooth at one side of a tooth space (or one side of a tooth), in the course of traverse of the work spindle in one direction, and on the tooth at the opposite side of the same space (or the opposite side of the tooth previously cut), during movement in the opposite direction; and to crown the tooth faces at the same time by a small angular movement of the spindle back and forth while making each endwise traverse. A ring 103 is mounted rotatably on the coaxial outer surface of the bearing 29 which contains the hub sleeve of pulley 28. It has an extension 104 at one side on which the cylinders 48 and 57 are mounted and a lug 105 at another side projecting between opposed pistons 106 and 107 contained in hydraulic cylinders 108 and 109, respectively. These cylinders are in the structure of the work saddle 15. The ring or holder also carries on its under side antifriction rolls 110, 111 mounted to rotate on parallel bearing studs and located with a space between them. A bar 112 is slidably mounted in a guideway in the work saddle and extends between the rolls 110, 111. That portion of the bar which lies between these rolls is formed with cam surfaces at the sides next to the rolls, such surfaces having a protuberant middle part and receding end portions. Or they may be of any other form suited to give a prescribed crowned or bowed form to the sides of the work gear teeth.

The cam bar 112 is provided with a series of rack teeth 113 on its upper side in mesh with an idle gear 114 supported rotatably by the saddle structure between the cam bar and the work spindle and in mesh with an encircling series of rack teeth 115 on the work spindle. Thus as the spindle reciprocates, the cam bar is moved at the same time in relatively opposite directions, and it imparts a slight rocking movement back and forth to the spindle. The plungers 106 and 107 are actuated hydraulically in alternation to bring the roll 110 against one side of the cam bar while the spindle travels in one direction, and the other roll against the cam bar while the spindle travels in the opposite direction. As shown in Fig. 3, the plunger 107 is activated to hold roll 111 against the cam bar, piston 106 being withdrawn by release of fluid from cylinder 108. This condition exists during the entire stroke in one direction. When the spindle travel is reversed, working fluid is admitted to the cylinder 108 and released from cylinder 109, whereby the roll 110 is brought against the cam bar. As latch 35 is mounted on the holder ring 103, the work spindle is rotated slightly in first one and then the opposite direction during each stroke, and the cutter is caused to act alternately on opposite tooth faces during alternate strokes of the work spindle.

Figure 6:
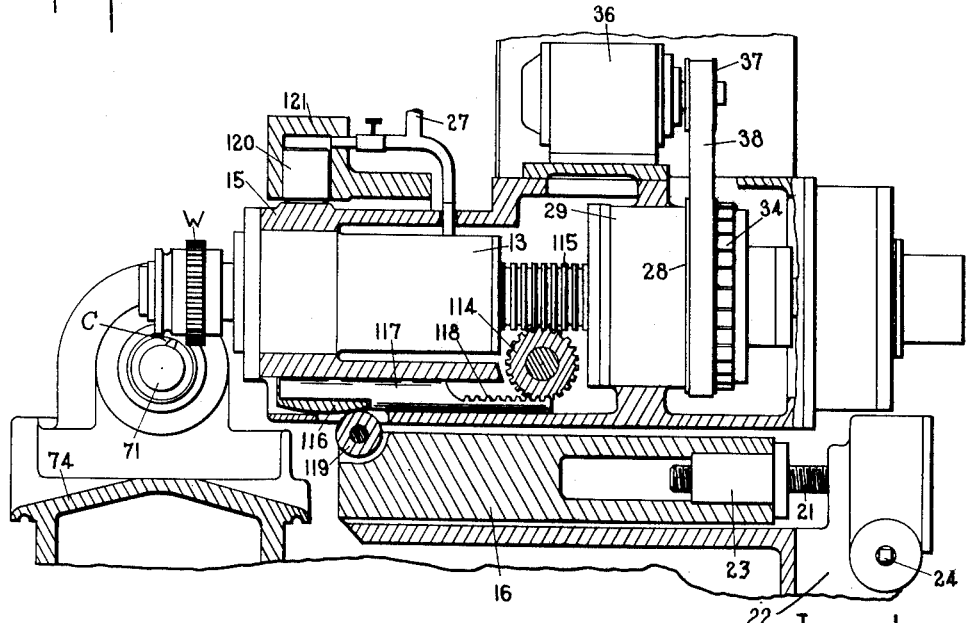
Fig. 6 is a sectional view similar to Fig. 1 of the upper part of the machine showing an alternative form of crowning means.

Crowning may be accomplished also by alternate withdrawal and advance of the work piece from and toward the cutter during cutting strokes, without rotation of the work spindle, (except that which may be caused by helical guides when helical teeth are being finished). An arrangement for crowning in the manner last referred to is shown in Fig. 6. A cam plate 116 is carried by a bar 117 which, like the cam bar 112, is mounted to reciprocate endwise in a path parallel to the spindle axis, being confined in a guideway in the work saddle and reciprocated by the spindle teeth 115, idle gear 114 and rack teeth 118 on the bar 117. The under side of cam plate 116 is convex and rests on a supporting roll 119 mounted on the carriage 16. A piston 120 in a hydraulic cylinder 121 is disposed to bear on the upper side of the saddle 15 and hold cam 116 in contact with roll 119. Working fluid is admitted to the cylinder 121 through a branch from the pipe 27. The conjoint action of cam 116 and hydraulic piston 120 causes the saddle to oscillate through a small angle about the axis of trunnions 18, 18 as the cam bar 117 is reciprocated.

Piston 120 and cylinder 121 are shown also in Fig. 1 but do not cause any such oscillating movement of the saddle when crowning is performed by oscillation of the work spindle. Under those conditions the cylinder 121 is disconnected from the working fluid supply (as by a valve 122), and the saddle is locked to the carriage 16 against an abutment plate 123 thereon by any suitable means such, for instance, as the screws 124 shown in Fig. 2, which are mounted in an overlying cross beam of the frame structure and bear on the saddle.

When crowning means are not employed and also the machine is operated to perform cutting on two tooth faces at the same time while the spindle travels in one direction only, the hydraulic piston and cylinder 120, 121 are used in conjunction with spring means to hold the saddle firmly against an abutment on the saddle carriage during the cutting strokes and to back off the work slightly from the cutter throughout the retracting strokes, in order to prevent any cutting action, or rubbing of the cutting edges on the work then. Such spring means are shown in connection with a further variant of the machine combination later described. They may be applied to the forms previously described, with disablement of the means which cause crowning. In the control of back off, working fluid is admitted to the cylinder 121 simultaneously with its admission to the cylinder 13 in the manner to cause advancing travel of the work spindle and is released when pressure fluid is admitted to retract the spindle.

A comprehensive view of the hydraulic and electrical system by which the machine is caused to perform the actions precedently described is given by the diagram in Fig. 7. In this diagram some of the parts shown in the preceding figures appear and are identified by the same reference characters.

The working fluid is taken by a pump 125 from a tank (located in the machine base or any other convenient location), and passed through a pipe 126 to a shut off valve 127 containing a piston which is moved to open the through passage by a solenoid 128 and closed by a spring 129 when the solenoid is inactive. The solenoid winding is connected through a control panel 130 with start and stop switches 131 and 132, and with a limit switch 133. When the circuit through the limit switch is closed, the solenoid winding can be activated by closing the starting switch 131 and deenergized by closing the stop switch 132.

The pipe line 126 is connected with a spring closed relief valve 134 which is designed to maintain a prescribed constant pressure in the system and permit return to the tank of excess liquid delivered by the pump. The symbol R adjacent to the outlet from this valve signifies a return connection with the tank, and similar symbols elsewhere in the diagram have the same significance.

The outlet pipe from the shut off valve 127 divides into three branches, of which branch 135 leads to the inlet port 136 of a valve 137, which I call the main circuit valve; the branch 138 leads to the inlet port 139 of the stroke pilot valve 68; and the branch 140 leads to the inlet port 141 of the belt tension valve 63. The stroke pilot valve 68 has ports on either side of the inlet port 139, one of which is connected with a pipe 142 and the other with a pipe 143. It contains a piston 144 which, in the position shown in the diagram, connects pipe 138 with pipe 142 and pipe 143 with an exhaust connection 145, and may be shifted so as to connect the supply pipe with pipe 143 and bring pipe 142 into communication with an exhaust pipe 146; (see Fig. 7–c).

Pipe 142 is connected by a branch 147 with a port 148 in the main circuit valve 137; by a branch 149 with one end of the cylinder 57 so as to deliver pressure to the latch retracting piston 56 in a manner to cause retraction of the index latch piston 49; and by a branch 150 with a port in the cylinder 57.

Pipe 143 from the stroke pilot valve is coupled by a branch 151 with the opposite end of cylinder 57 from that to which the branch 149 is connected; and is connected by a branch 152 with one end of the main circuit valve 137.

The main circuit valve contains a control piston 153 and has ports which are connected respectively with the pipe 27 and with a pipe 154 leading to the opposite end of the cylinder 13 from that to which pipe 27 leads. A pipe 155 is connected to the opposite end of the main circuit valve from that to which pipe 152 is connected, and an intermediate port is connected with a pipe 156; both the latter pipes being branches of a pipe 157, which is connected with a port 158 in the side of the latch piston cylinder 48. Another port in the latter cylinder is connected by a pipe 159 with the cylinder 57. The main circuit valve has other ports connected by return pipes 160 and 161 with the supply tank.

The belt tension valve 63 has an intermediate port from which a pipe 162 leads to the pressure end of cylinder 43 in which the belt tension piston 42 is contained. It also has a return connection 163 to the tank and contains a piston 164 which is shiftable to couple pipe 162 either with the pressure line 140 or with the exhaust connection 163.

The crowning piston cylinders 108 and 109 are connected by pipes 164a and 165 with the pipes 154 and 27, respectively, whereby the work spindle is oscillated to bring opposite tooth faces into cutting position in time with its reciprocating movements in opposite directions.

Fig. 7 shows the several valves in the positions which they occupy while the work spindle is making an advancing stroke after having been indexed. The solenoid 128 is then energized to hold the valve 127 open; pressure is exerted through the pipes 138, 142, 150, 159, 157 and 155 to hold the main circuit valve piston at one extremity of its travel; the belt tension valve 63 is held by its spring 67 in the position which causes pressure to be exerted through pipes 140 and 162 on the belt tension piston 42 to hold the belt tension lever 39 out of pressing contact with the indexing belt 38; the working fluid is allowed to flow through pipes 135 and 27 to the right hand end of spindle driving cylinder 13; pressure is exerted through pipe 165 on the crowning piston 106; and working fluid is allowed to exhaust from the cylinder 13 through pipe 154 and from cylinder 109 through pipe 164a to the return pipe 161.

When the work spindle reaches the end of that stroke, the length of which is predetermined by the position of dog 70, the stroke pilot valve piston 144 is shifted by dog 70 to the position shown in Fig. 7–c so as to connect the supply line 138 with the pressure line 143 and connect pipe 142 with the exhaust 146. Then working pressure is exerted through pipes 143 and 152 against the left hand end of the main circuit valve piston 153, and the pressure existing in pipe line 142 and 147 is released. At the same time pressure is exerted through pipe 151 to shift the latch retracting piston to its opposite position, making the dog 55 potentially operative and shutting off the port 167 in the latch retracting valve to which branch pipe 150 is connected. Fluid in the right hand end of the main circuit valve is discharged through the line 155, 157, 159 as long as port 167 remains open and, if this port is closed before piston 153 reaches the end of its stroke, the fluid flows from pipe 157 to pipe 142, and the exhaust, through a bypass 168 in which a check valve 169 is interposed to prevent flow through the bypass in the opposite direction. The main circuit valve piston is then in the position shown by Fig. 7–a, whereby the working fluid in pipe 135 is permitted to flow to the left hand end of the work spindle cylinder 13 and the fluid in the right hand end of that cylinder is released to the return pipe 160.

When the work spindle nears the end of its retractive stroke (to the right with respect to these drawings), dog 65 engages and moves the operating lever 64 of the belt tension valve, and shortly thereafter engages the operating lever 69 of the stroke pilot valve; these levers being suitably formed or located to cause engagement in this order. The belt tension valve is then shifted to connect pipe 162 with the return to the tank, whereby the pressure on the belt tension piston 42 is relieved and the belt tension lever is pressed against the belt of the indexing motor by spring 44. The stroke pilot valve piston 144 is shifted to its previous position, shown in Fig. 7, admitting pressure to the latch retracting piston 56 so that the latter is displaced and retracts the index latch 35, allowing the index plate and work spindle to be rotated. While this latch rests on the circumference of the index plate, before entering the next notch in the plate, its piston 49 closes the port 170 to which pipe 159 leads, thereby preventing flow of working fluid through the line 157 to the right hand end of the main circuit valve. But pressure is admitted through pipe 147, port 148 and a short circuit through pipes 156 and 155 to that end of the main circuit valve, whereby the piston 153 is shifted until it closes the port 148. It then occupies the position shown in Fig. 7–b, wherein it closes the ports to both pipes 27 and 154 which lead to the cylinder 13. Thus the work spindle is made to pause until indexing is completed. Entrance of the latch into the approaching notch of the index plate then allows port 170 to be opened and pressure transmitted through pipes 157, 155 to the main circuit valve, whereby piston 153 is moved to the position shown in Fig. 7, and the connections to and from the cylinder 13 are opened which cause the work spindle to make a stroke from right to left. As the spindle proceeds in this direction, dog 65 recedes from the operating lever 64 and allows the spring 67 to return the belt tension valve piston to its previous position, whereby pressure is applied to the belt tension piston 42 and the belt 38 is slackened.

The above described cycle is performed repeatedly until a dog 172, which is associated in some manner with the work spindle to rotate therewith, as by being mounted on the pulley 28, or index plate, etc., engages the limit switch 133 in a manner to cause the circuit of the solenoid 128 to be opened. Suitable electrical interlocks, of known character, are provided to cause the solenoid circuit to remain closed after the starting switch 131 (which may be of the push button type), has been depressed and released, and to put the circuits in condition for energizing the solenoid 128 by the starting switch after being interrupted by the limit switch.

It has been stated previously that the invention may be embodied in different forms and variations. Certain modifications from the forms previously described are shown in Figs. 8 and 9. Here a stationary cutter $C^1$ is substituted for the rotating cutter of the previous description, successive teeth of the work gear are cut and finished in the course of a number of reciprocations of the work spindle and indexing of the spindle is performed only after a predetermined number of cutting and return strokes have been made, and the work is backed off and held clear of the cutter throughout the return or non-cutting strokes.

The cutter $C^1$ (which is shown also in end view in Fig. 8–a) has a plurality of teeth, each of which has cutting edges on one end in the outline prescribed for the space between two teeth of the work piece, and is adapted to be turned so as to bring different teeth into the operative position. It is mounted on a shaft 174 held in a bearing 175 on the upper end of a stool 74a, which is like the stool 74 previously described, except that it has no provisions for holding a motor, and is adjustable endwise and angularly in the same manner and by like means. The shaft can be turned to bring the several cutter teeth into operative position by a shaft 176 carrying a worm 177 meshing with a gear 178 secured on the shaft. This worm and gear pair is of self locking character, and the shaft may be additionally locked by a suitable clamp 179 such as is common in machine tools.

Other cutters can be substituted for the cutter $C^1$ (of which the teeth extend parallel to the axis), such as the cutter $C^2$ having helical teeth shown in Fig. 8–b, or a single tooth cutter $C^3$ (Fig. 8–c) inserted and clamped in a bar 174a which can be substituted for the shaft 174, or a plurality of cutters mounted and clamped in the bar. These are merely an illustrative few of the cutters of various kinds and outlines which may be used in this combination, and any of them can be inclined more or less from an exactly centered position with respect to the work spindle by the worm and gear couple previously described.

In finishing the work piece by a stationary cutter in a plurality of cuts, the work must be fed toward the cutter prior to each cutting stroke by an amount corresponding to the permissible depth of each cut. For this purpose a depth feed cam 180 is mounted rotatably on the slide or carriage 16 and the work spindle saddle 15 carries a roll 181 on its under side which bears on the cam. This cam is formed in part as, or connected with, a gear segment 182, which meshes with rack teeth on a piston 183 reciprocable in a hydraulic cylinder 184 in the carriage 16. A spring 185 is confined between one head of the cylinder (in this illustration the left hand head), and exerts force tending to shift the piston to the opposite end of the sylinder. A port 186 is provided at the right hand end of the cylinder for connection of a pipe (shown in diagrams later described), by which fluid pressure can be transmitted to the cylinder in opposition to spring 185.

The cam is rotated clockwise by movement of the piston 183 from right to left, and has an active surface extending with gradual recession from a high point $a$ to a low point $b$. This latter portion is low enough to permit the saddle to come to rest on an abutment 187 on the carriage. Advance of the depth feed piston is effected step by step by admission of regulated additions of pressure fluid to the cylinder while the work spindle makes its retracting strokes.

The work saddle 15 is held in supported contact with the depth feed cam during working strokes by piston 120 under the pressure of the working fluid which is admitted to cylinder 121 through a branch from pipe 27 while the working fluid is delivered to the right hand end of the work spindle cylinder 13. A back off spring 188 is mounted in the carriage 16 and presses on the saddle 15 with tendency to raise the saddle, and with that effect when the working fluid is released from the cylinder 121. In moving thus for depth feeding and back off, the saddle oscillates around its trunnions 18, 18.

The back off spring 188 and piston 120, or equivalents thereof, are employed in machines embodying this invention without depth feeding or crowning means; and the spring here shown is an illustration of the back off spring means referred to at an earlier point in this specification.

A cam 189 (Fig. 9) is associated with the depth feed cam, being mounted on the shaft 190 on which the cam is mounted, and is arranged to actuate an indexing switch 191 in the electrical control system, whereby the hydraulic system is conditioned to cause indexing of the work after a predetermined number of working strokes of the cutter spindle have been made, instead of at the end of each retracting stroke as in the case of the previously described embodiment of the invention. An illustrative diagram of the operative hydraulic and electrical system for accomplishing the effects last described is shown in Figs. 10, 10–$a$ and 10–$b$; these figures differing from one another by showing some of the movable parts in respectively different positions. This diagram is in the main like that shown in Fig. 7, but differs by the addition of an electrically operated index control valve 192, and of the parts above described with reference to Figs. 8 and 9, and in a different arrangement of some of the pipe lines, whereby the desired effects are obtained.

Fig. 10 shows the movable parts in the positions taken during working strokes of the work piston. The piston of the stroke pilot valve 68 is in position to make connection from the pressure supply pipe 138 through pipe 142 and a branch 193 of the latter pipe to the right hand end of the main circuit valve 137, whereby the piston 153 thereof is held at the left hand end of its stroke. The branch 140 of the pressure line is connected with a branch 194 which leads to the main circuit valve and therethrough to connection with the pipe 27 which conducts pressure to the right hand end of cylinder 13 and to the piston 120. The connecting pipe 154 from the other end of cylinder 13 to the main circuit valve is then in communication with the return pipe 161 which leads back to the oil tank.

The indexing control valve piston 195 is connected at one end with the core of a solenoid 196 and at the other end with a spring 197. The solenoid circuit is controlled by indexing switch 191 and is open except when that indexing switch is shifted by the cam 189 associated with the depth feed cam 181. (This diagram shows an actuating pin for the indexing switch as carried by the depth feed cam piston 183 for clarity; and such an arrangement is in fact an equivalent alternative to the one shown in Fig. 9.) Thus the solenoid 196 is inactive and the piston 195 is held by spring 197 at the left hand end of its stroke. In this position it puts a pipe 198, connected with the left hand end of main circuit valve 137, in communication with a pipe 199 which is then in communication through the stroke pilot valve 68 with the return connection 145 to the tank. At the same time it makes communication between a branch 200 of the pipe line 140, 194 with a pipe 201 leading to the belt tension cylinder 43, whereby pressure is exerted therein to hold the belt tension lever 39 out of pressure contact with the indexing belt 38. It also makes communication between a pipe 202, coupled to the pressure chamber of the belt retracting piston cylinder 57, and a return pipe 203 to the tank. A spring 561 then holds piston 56 at the outer limit of its movement, in potentially active condition for retracting the index latch 35.

When the work piston reaches the end of its working stroke, dog 70 shifts the stroke pilot valve piston 144 to the position shown in Fig. 10–$a$, whereby pressure is admitted from supply pipe 138 to the pipe 199 and thence through the indexing control valve 192 and pipe 198 to the left hand end of the main circuit valve 137; and the pipe 193 from the right hand end of the main circuit valve is connected with the return pipe 146. Hence the piston 153 is shifted to the position wherein it permits pressure to be admitted through pipes 140, 194 and 154 to the left hand end of the cylinder 13 and released from the right hand end of that cylinder and the back off cylinder 121, to the return line 160. The work spindle then is propelled through its return stroke. Pressure is also transmitted through a pipe 204, which branches from the pipe 154, through a check valve 205 and an adjustable needle valve 206 to a pipe 207 which leads to the port 186 in cylinder 184.

This needle valve is a metering device which permits a predetermined limited amount of oil to enter the cylinder 184 during continuance of the return stroke of the piston and thereby causes rotation of the depth feed cam 180 through the angle which causes a step of depth feeding movement of desired extent to be imparted to the work.

At the end of the spindle return stroke, the dog 65 returns the stroke pilot valve piston to the position shown in Fig. 10, whereby the main circuit valve piston is shifted correspondingly, the last described communications through that valve are reversed, and the work spindle is caused to make a working stroke. Although the belt tension valve piston 164 is shifted at the end of the spindle return stroke, no effect is produced thereby, because the pipe 162 leading therefrom (which is connected at first with the pressure line 140 and then with the return line 163), leads to a port in the indexing control valve 192 which is blocked by an enlargement of the piston 195 then, and at all other times except when that piston is shifted by solenoid 196. As dog 65 recedes on each working stroke, spring 67 returns the belt tension valve piston to the position shown in Figs. 10 and 10-a.

This cycle continues until the spindle has made a predetermined number of working and return strokes (determined by the rate at which oil passes the metering valve 206), when the indexing switch 191 is operated to energize the solenoid 196. Then the piston 195 of the indexing control valve is shifted to the position shown in Fig. 10-b.

Although the depth feed cam actuates the indexing switch at the end of the return stroke of the piston, the solenoid 196 is not energized until the work spindle completes its next working stroke. This delay may be accomplished by an open gap in the circuit of the indexing switch 191 which is closed by the work spindle at the end of the working stroke, or by a switch in interlocking connection with switch 191 arranged to be actuated by lever 64 at the end of the stroke, and only there. When the indexing valve piston is thus shifted, it opens communication between the pipe 162 and pipe 201 so that, when the belt tension valve piston 164 is actuated by dog 65 at the end of the following return stroke, the pressure existing in the belt tension valve cylinder 43 is released and spring 44 is enabled to apply tension to the indexing belt 38 through lever 39. The actuating lever 64 for the belt tension valve is arranged to be engaged and moved by dog 65 at this time slightly before the actuating lever 69 for the stroke pilot valve is engaged and shifted by the dog. When the stroke pilot valve is so shifted, it allows pressure to be transmitted through the pipes 140 and 202 by which are now put into communication by the indexing control valve), to the cylinder 57, whereby the latch retracting piston 56 is moved so as to withdraw the indexing latch 35 from the notch of the indexing plate 34 with which it was previously engaged. The indexing plate and spindle are now free to rotate and are rotated by the indexing motor. Immediately after being thus retracted, latch 35 is released and pressed by its spring 52 against the circumference of the indexing plate, and is entered in the next notch of the index plate to arrive in register with it. It may be desirable to provide a metering or throttling device in the line 202 in order to insure that the belt tension valve has exhausted before tension is applied to the indexing pulley; but it is not essential.

At the same time that the stroke pilot valve admits pressure to the latch retracting piston, pressure is transmitted through pipe 193 to the right hand end of the main circuit valve, thereby shifting its piston 153 to the left from the position, as shown in Fig. 10-a, which that piston had previously occupied. The pipe 198 connecting the left hand end of the main circuit valve with the index control valve 192 is now closed by the piston 195, but a branch 210 from pipe 198 is coupled through the main circuit valve with a pipe 211 which is now coupled through the index control valve with pipe 199, and the latter pipe is coupled through the stroke pilot valve 68 with the return connection 145. Thus movement of the piston 153 is permitted until the port in the main circuit valve into which pipe 211 opens is occluded. This movement, however, is sufficient to shut off both the pipes 27 and 154, leading to opposite ends of the cylinder 13, whereby the work spindle is caused to stand still while the indexing rotation takes place.

Advance of the latch retracting piston 56 has opened port 167 in cylinder 57, thereby putting a pipe 212, which branches from pipe 207, into connection with pipe 159 leading to cylinder 48 which contains the latch carrying piston 49. The port 170 in the latter cylinder is closed by piston 49 as long as latch 35 rests on the circumference of the index plate, but when the latch drops into a notch, port 170 is connected with a return line 213. Thereby the pressure chamber of the cylinder 184 of the indexing mechanism is connected with the return line to the tank and spring 185 is permitted to return the piston 183, and depth feed cam, to starting position. With the return of these parts, the indexing switch 191 breaks the circuit of the solenoid 196 and the piston 195 of the indexing control valve is returned to the position shown in Figs. 10 and 10-a, which may be called its normal position. With this shifting of piston 195, the connections to and from the main circuit valve 137 are set for shifting the piston therein to its left hand position and the work spindle is started on the first working stroke in a new cycle of cutting and depth feeding actions.

When the piston 195 is in the normal position herein defined, it blocks the pipes 211, 162 and 142.

A time delay relay is connected in the circuit of indexing switch 191 and solenoid 196 in order to permit complete exhaust of pressure fluid from the cylinder 184 before the indexing control valve piston is shifted to normal position.

The precedently described sequence of operations is repeated until all, or a prescribed number, of the teeth of the work piece have been finished, when the limit switch dog 172, associated with the work spindle, causes the solenoid 128 of the shut off valve 127 to be de-energized.

The details shown in the drawings and precedently described are not to be construed as specific limitations of the invention. My intent has been to disclose the general principles of the invention by reference to specific embodiments with the understanding that reversals, variations, and modifications differing more or less widely from the illustrations here given may be made within the scope of the invention and appended claims. Variations of these principles, other than those precedently described, within my contemplation, include indexing the work at the end of each stroke in each direction so as to perform cutting on different parts of the work during opposite strokes, giving the spindle more rapid return than cutting movements when cutting is performed only during alternate strokes, otherwise varying the speed of the work spindle in the course of its cycle, providing a plurality of tools for either simultaneous or alternate action, causing one tool to cut one side of a tooth and a second tool to cut the other side of the same tooth or one side of a different tooth, either in the course of successive forward and return strokes or successive strokes in one direction only, etc.

What I claim is:

1. A machine for cutting and finishing gears comprising supporting means, a cylinder on said supporting means, a spindle having a piston portion fitted to reciprocate in said cylinder and having a part protruding from the cylinder adapted to carry a gear to be finished or a gear blank, means for causing flow of working fluid to said cylinder at opposite sides of the piston alternately and exhausting the fluid, a cutter mounted in position to perform a cutting action on a work piece carried by the spindle during endwise movement of the spindle, and means for displacing the cylinder and spindle laterally back and forth in timed relation with the endwise reciprocating movements of the spindle.

2. A machine for cutting and finishing gears comprising supporting means, a cylinder on said supporting means, a spindle having a piston portion fitted to reciprocate in said cylinder and having a part protruding from the cylinder adapted to carry a gear to be finished or a gear blank, means for causing flow of working fluid to said cylinder at opposite sides of the piston alternately and exhausting the fluid, a cutter mounted in position to perform a cutting action on a work piece carried by the spindle during endwise movement of the spindle, and means for imparting a back and forth angular movement to the spindle around its axis in the course of its endwise travel in each direction for causing the work to be cut with a crowned formation.

3. A machine for cutting and finishing gears comprising a supporting structure, a cylinder mounted thereon, a work spindle having a piston enlargement fitted to reciprocate and rotate in said cylinder, the piston having a protruding portion adapted to carry a gear to be finished or a gear blank, a pulley and a notched index plate engaged with the spindle in torque transmitting relation thereto, a latch mounted externally of the plate adapted to enter individual notches thereof normally preventing rotation of the pulley and index plate, a driving motor, a belt driven by said motor loosely embracing said pulley and adapted to slip thereon, a belt tightener adapted to exert pressure on said belt for causing it to embrace the pulley more tightly, and a hydraulic operating system, including connections for working fluid leading to the cylinder at opposite sides of the piston therein, a fluid actuated presser for holding the belt tightener clear of the belt against spring resistance tending to press the tightener against the belt, hydraulic latch retracting means, and valves controlled by the spindle in its reciprocating movements for causing admission of working fluid to opposite ends of the cylinder, and exhaust of the fluid therefrom alternately, and for releasing hydraulic pressure from the belt tightener and retracting the indexing latch whereby to cause indexing rotation of the spindle.

4. A machine tool comprising a supporting structure, a saddle and a cutter mounted on said supporting structure, a motor cylinder on the saddle, a work spindle having a piston portion contained in said cylinder and being movable reciprocatively therein by fluid admitted to and exhausted from the cylinder alternately at opposite sides of said piston portion, the spindle having a projecting portion adapted to carry a work piece in position to be cut by said cutter during reciprocating movements of the spindle, the saddle being movable relatively to the supporting structure in directions to vary the distance from the cutter of the path in which the work piece is reciprocated, fluid actuated means bearing on the saddle in the direction of the path of movement thereof relatively to the supporting structure, and control means operative to cause admission of fluid pressure to said fluid actuated means simultaneously with admission of fluid pressure to one end of the cylinder.

5. The machine tool set forth in claim 4, including further coacting cam and contact elements, one of which is mounted on the supporting structure and the other is carried by the saddle, arranged to be held in contact by pressure exerted through said fluid actuated means.

6. The machine tool set forth in claim 4, including further coacting cam and contact elements, one of which is mounted on the supporting structure and the other is carried by the saddle, arranged to be held in contact by pressure exerted through said fluid actuated means, combined with means for shifting said cam element progressively in the course of a plurality of reciprocating movements of the work spindle, whereby to effect depth feeding movement of the work piece relatively to the cutter.

7. The machine tool set forth in claim 4, including further coacting cam and contact elements, one of which is mounted on the supporting structure and the other is carried by the saddle, arranged to be held in contact by pressure exerted through said fluid actuated means, said cam element being disposed to cause changes in the distance between the work spindle path and the cutter in opposite directions during strokes of the spindle in one direction, whereby to cause a crowned formation of the work piece.

8. In a machine tool of the character described, a supporting structure including a cylinder, a work spindle having a piston element contained in said cylinder and fitting reciprocably and rotatably therein, the spindle having a portion external to the cylinder adapted to carry a work piece, a pulley and a notched index plate in torque transmitting coaxial relationship with the spindle, a motor driven belt loosely surrounding said pulley, a belt tightener mounted adjacent to said belt and being movable in opposite directions to tighten and relax, respectively, the belt on the pulley, fluid pressure and spring means acting oppositely on said belt tightener, a restraining latch mounted to enter any of the notches of said index plate, spring means acting on said latch to force it toward the index plate, fluid pressure actuated means operable to retract the latch, and means controlled by the spindle in its reciprocative movements for admitting working fluid to opposite ends of said cylinder alternately and for causing actuation of the latch retracting means and shifting of said belt tightener at predetermined times in the cycle of the machine for causing indexing rotation of the spindle.

9. In a machine tool of the character described, the combination of a supporting structure, a cylinder on said supporting structure having connections at opposite ends for admission and exhaust of working fluid, a work spindle having a piston element fitting the cylinder and a protruding portion adapted to carry a work piece, a rotation transmitting element in connection with said spindle, opposed pressure actuated members arranged to exert pressure on abutting portions of said rotation transmitting element tending to rotate the same alternately in opposite directions, and control means for admitting fluid pressure alternately to opposite ends of the cylinder and at the same time to each of the last named pressure operated elements in alternation.

10. In a machine tool of the character described, the combination of a work support, a cylinder mounted thereon, a spindle having a piston portion fitting said cylinder and a protruding portion adapted to carry a work piece, means for admitting pressure fluid alternately to opposite ends of the cylinder for reciprocating the work piece, a cam element mounted for reciprocating movement in parallel with the spindle, means coacting with said cam to impart motion to said spindle, and transmission means operated by the spindle for moving the cam back and forth.

11. In a machine tool of the character described, a supporting structure, a work carriage on said supporting structure, means for moving said carriage, a saddle pivotally mounted on said carriage, a work spindle reciprocably mounted in said saddle, means for reciprocating said spindle, a stool mounted on said supporting structure with provisions for angular adjustment about a prescribed axis, a shaft rotatably supported by the stool on an axis intersecting the before named axis, a cutter carried by said shaft located in said axis of angular adjustment, and means for rotating the shaft.

12. In a machine tool of the character described, a supporting structure, a work carriage on said supporting structure, means for moving said carriage, a saddle pivotally mounted on said carriage, a work spindle reciprocably mounted in said saddle, means for reciprocating said spindle, a stool mounted on said supporting structure, with provisions for angular adjustment about a prescribed axis, a shaft rotatably supported by the stool on an axis intersecting the before named axis, a cutter carried by said shaft located in said axis of angular adjustment, a motor mounted in the stool, and transmission means between the motor and shaft for rotating the shaft and cutter.

13. A machine for cutting and finishing gears, comprising a work spindle adapted to carry a gear to be finished or a gear blank, means for reciprocating said spindle axially, a formed cutter having an edge complemental to tooth face curves to be formed on the work piece, said cutter being located in intersecting relation with the path of a portion of the work piece carried by the spindle and between the limits of said path, whereby to perform a cutting action on the work piece as the latter travels along said path, and a stool on which the cutter is mounted; said stool being adjustable translatively in direction such as to vary the distance of the cutter from the work spindle axis and also angularly about the axis of its path of translative adjustment and the axis of said stool intercepting the axis of said spindle, whereby to accommodate the cutter to work pieces of helical gear character, and means for rotating the spindle about its axis simultaneously with its axial reciprocating movements.

14. In a machine tool of the character described, a base, a support on said base, a saddle pivotally mounted on said support, a spindle carrier member fixed in said saddle, a spindle mounted for axial movement in said carrier member, means to reciprocate said spindle relative to said carrying member, coacting contact and cam means one of which is mounted on said support and the other of which is mounted on said saddle, means actuated by the reciprocation of said spindle for introducing relative movement between said cam means and said contact means so as to move said saddle about its pivotal mounting.

15. A machine for cutting and finishing gears comprising supporting means, a saddle mounted on said supporting means, a spindle fitted to reciprocate in said saddle and having a portion projecting therefrom adapted to carry a work blank, means for reciprocating said spindle, guide means to control the rotative position of said spindle relative to said saddle, a cutter mounted in position to perform a cutting action on said work blank during endwise movement of the spindle, and means imparting a back and forth angular movement to the spindle around its axis in the course of its endwise travel for causing the work to be cut with a crowned formation.

16. In a machine of the character described, a base, a carriage mounted for movement on said base, means for adjusting said carriage longitudinally, a saddle pivotally mounted on said carriage, a spindle mounted to reciprocate in said carriage, means for reciprocating said spindle, guide means to control the relative rotation between said saddle and said spindle, coacting cam and contact means extending lengthwise of said spindle, means to impart relative movement to said cam and contact means whereby said spindle and saddle are moved about the pivotal mounting of said saddle in accordance with the reciprocation of said spindle.

17. In a machine tool of the character described, the combination of a work support, a work saddle mounted thereon, a spindle mounted in said work saddle and having a protruding portion adapted to carry a work piece thereon, means for reciprocating said spindle in said saddle, cam mechanism having an actuating element mounted for reciprocating movement in a direction parallel with said spindle, a contact member cooperating with said cam mechanism acting to impart motion to said saddle and transmission means operative in response to reciprocation of said spindle to move said actuating element.

EDWARD W. MILLER.

References Cited in the file of this patent

UNITED STATES PATENTS

| Number | Name | Date |
|---|---|---|
| 255,409 | Brainard | Mar. 28, 1882 |
| 766,245 | Hardinge | Aug. 2, 1904 |
| 842,989 | Wingo | Feb. 5, 1907 |
| 892,810 | Christensen | July 7, 1908 |
| 1,213,236 | Natisch | Jan. 23, 1917 |
| 1,314,706 | Sanders | Sept. 2, 1919 |
| 1,341,541 | Buckmann | May 25, 1920 |
| 2,198,882 | Monroe | Apr. 30, 1940 |
| 2,254,312 | Poock et al. | Sept. 2, 1941 |
| 2,266,889 | Miller et al. | Dec. 23, 1941 |
| 2,271,848 | Tcimpidis | Feb. 3, 1942 |
| 2,273,050 | Kruse | Feb. 17, 1942 |
| 2,282,193 | Lambrix | May 5, 1942 |
| 2,299,915 | Mattson | Oct. 27, 1942 |
| 2,304,779 | Curtis | Dec. 15, 1942 |
| 2,325,836 | Drummond | Aug. 3, 1943 |
| 2,349,199 | Richards | May 16, 1944 |
| 2,370,367 | Marsilius | Feb. 27, 1945 |